United States Patent
Taiana et al.

(10) Patent No.: US 11,842,512 B2
(45) Date of Patent: Dec. 12, 2023

(54) APPARATUS FOR DETERMINING AN ANGLE OF A TRAILER ATTACHED TO A VEHICLE

(71) Applicant: CONTINENTAL AUTOMOTIVE GMBH, Hannover (DE)

(72) Inventors: Matteo Taiana, Appiano Gentile (IT); Peter Bone, Lewes (GB)

(73) Assignee: Continental Automotive GmbH, Hannover (DE)

(*) Notice: Subject to any disclaimer, the term of this patent is extended or adjusted under 35 U.S.C. 154(b) by 668 days.

(21) Appl. No.: 17/066,101

(22) Filed: Oct. 8, 2020

(65) Prior Publication Data
US 2021/0027490 A1 Jan. 28, 2021

Related U.S. Application Data

(63) Continuation of application No. PCT/EP2019/057354, filed on Mar. 25, 2019.

(30) Foreign Application Priority Data

Apr. 9, 2018 (EP) .................................... 18166219

(51) Int. Cl.
*G06K 9/00* (2022.01)
*G06T 7/73* (2017.01)
(Continued)

(52) U.S. Cl.
CPC .................. *G06T 7/74* (2017.01); *B60D 1/06* (2013.01); *B60D 1/48* (2013.01); *B62D 15/027* (2013.01);
(Continued)

(58) Field of Classification Search
CPC ........................................... G06T 2207/30252
See application file for complete search history.

(56) References Cited

U.S. PATENT DOCUMENTS

| 8,073,594 B2 | 12/2011 | Lee et al. |
| 9,085,261 B2 | 7/2015 | Gibson et al. |

(Continued)

FOREIGN PATENT DOCUMENTS

| DE | 102016114060 A1 | 2/2018 |
| EP | 159352 A1 | 10/1985 |
| WO | 2012103193 A1 | 8/2012 |

OTHER PUBLICATIONS

Fuchs, C. et. al, 3D Pose Estimation for Articulated Vehicles Using Kalman-Filter Based Tracking,Jul. 23, 2016, pp. 109-113, vol. 26, Issue 1, Springer Link.
(Continued)

*Primary Examiner* — Hadi Akhavannik

(57) ABSTRACT

The disclosure relates to an apparatus for determining an angle of a trailer with respect to a vehicle. A camera captures first, second, and third images when the trailer is at a first, second, third orientations respectively with respect to the vehicle. A processing unit determines at least one image location of at least one feature of the trailer in the first image, the second image, and the third image. The processing unit determines a rotational angle of the trailer about the tow ball for the trailer in the third orientation with respect to the first orientation comprising utilization of the at least one 3D location of the at least one feature of the trailer when the trailer was in the first orientation and the 3D location of the one feature of the trailer when the trailer was in the third orientation.

20 Claims, 12 Drawing Sheets

(51) Int. Cl.
*B60D 1/06* (2006.01)
*B60D 1/48* (2006.01)
B62D 15/02 (2006.01)
H04N 23/54 (2023.01)

(52) U.S. Cl.
CPC .... *G06T 2207/30252* (2013.01); *H04N 23/54* (2023.01)

(56) References Cited

U.S. PATENT DOCUMENTS

| | | | | |
|---|---|---|---|---|
| 9,809,169 | B1* | 11/2017 | Naboulsi | B60R 1/025 |
| 2016/0362135 | A1* | 12/2016 | Xu | B62D 13/06 |
| 2017/0043807 | A1* | 2/2017 | Shepard | B60D 1/245 |
| 2017/0341583 | A1* | 11/2017 | Zhang | B60R 1/00 |
| 2018/0081370 | A1 | 3/2018 | Miller et al. | |
| 2018/0251154 | A1* | 9/2018 | Lu | G06T 7/246 |
| 2019/0161121 | A1* | 5/2019 | Greenwood | G06V 10/22 |

OTHER PUBLICATIONS

International Search Report and Written Opinion dated Jun. 25, 2019 from corresponding International Patent Application No. PCT/EP2019/057354.

* cited by examiner

Rotation around the tow ball: spherical joint, 3 DOF
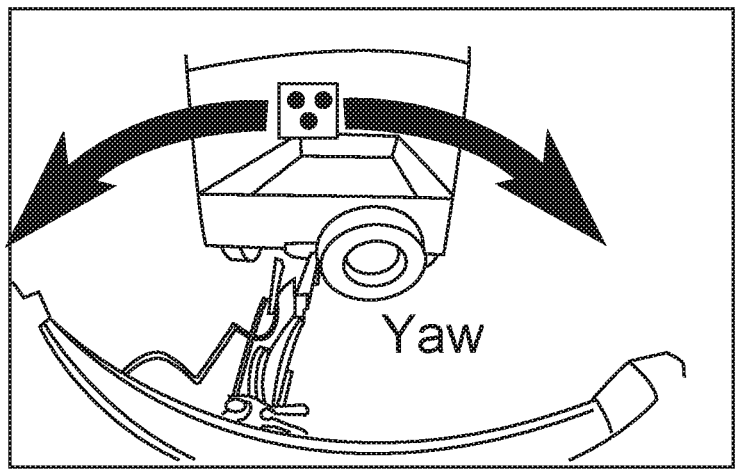
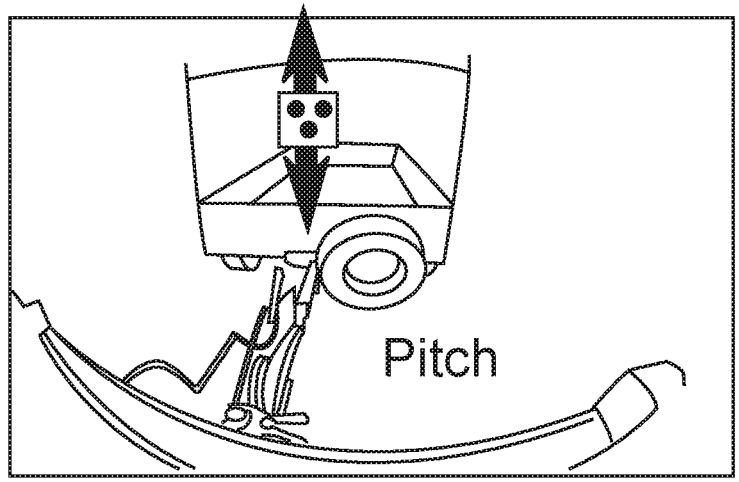
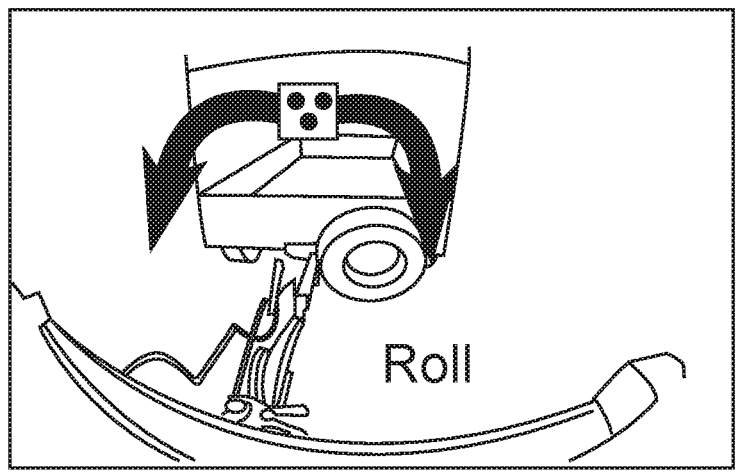
Fig. 5

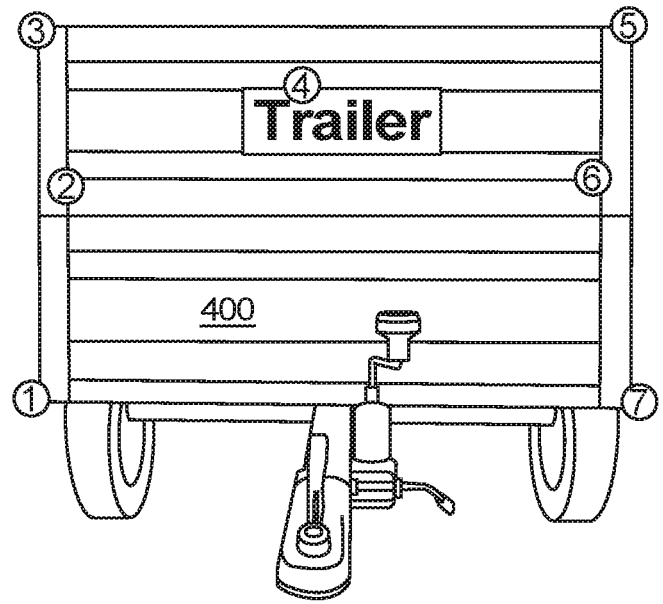
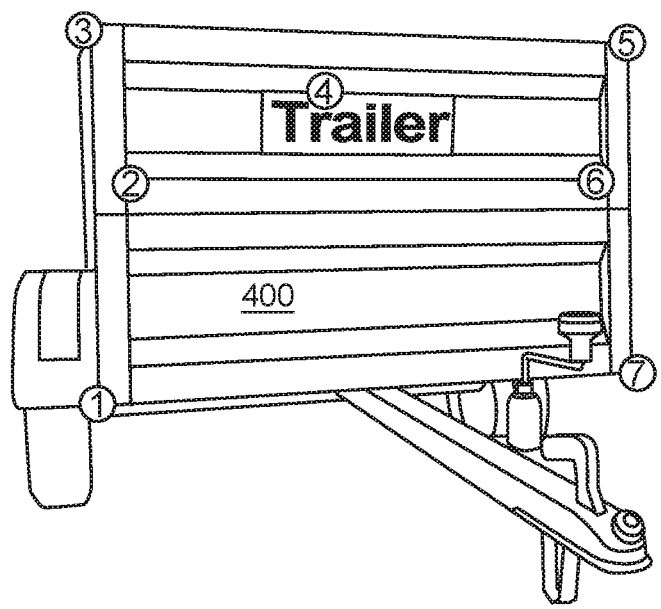
Fig. 6

APPARATUS FOR DETERMINING AN ANGLE OF A TRAILER ATTACHED TO A VEHICLE

CROSS-REFERENCE TO RELATED APPLICATIONS

This application claims the benefit of PCT Application PCT/EP2019/057354, filed Mar. 25, 2019, which claims priority to European Application EP18166219, filed Apr. 9, 2018. The disclosures of the above applications are incorporated herein by reference.

TECHNICAL FIELD

The disclosure relates to an apparatus for determining an angle of a trailer attached to a vehicle, and to a method for determining an angle of a trailer attached to a vehicle, as well as to a computer program element and a computer readable medium.

BACKGROUND

The general background of this disclosure is the field of driving systems such as Trailer Reverse Assist (TRA) that help drivers reverse a vehicle that has a trailer attached to it. Existing system can use expensive LIDAR sensors.

There is a need to provide an improved technique for assisting a driver when reversing a vehicle that has a trailer attached.

SUMMARY

According to a first aspect of the disclosure, an apparatus for determining an angle of a trailer with respect to a vehicle is provided. The apparatus includes an input unit and a processing unit. The input unit is configured to provide the processing unit with at least one first image and a second image. The at least one first image was acquired by a camera fixedly mounted to a vehicle at a location other than a location of a tow ball fixedly mounted to the vehicle. The location of the camera is known with respect to the location of the tow ball. A part of a trailer at a position of the tow ball can rotate about the tow ball. The at least one first image was acquired when the trailer was in a first orientation with respect to the vehicle. The at least one first image includes image data of the trailer. The second image was acquired when the trailer was in a second orientation with respect to the vehicle. The second image includes image data of the trailer. The processing unit is configured to determine at least one image location of at least one feature of the trailer in one of the at least one first image. In addition, the processing unit is configured to determine at least one image location of the at least one feature of the trailer in the second image. The processing unit is configured to determine a system calibration that includes utilization of triangulation with respect to the at least one image location of the at least one feature of the trailer in the one of the at least one first image and the at least one image location of the at least one feature of the trailer in the second image. The processing unit is configured to determine at least one 3D (3 dimensional) location of the at least one feature of the trailer when the trailer was in the first orientation including utilization of the at least one image location of the at least one feature of the trailer in the one of the at least one first image and the system calibration. The input unit is configured to provide the processing unit with a third image. The third image was acquired when the trailer was in a third orientation with respect to the vehicle. The third image includes image data of the trailer. The processing unit is configured to determine at least one image location of the at least one feature of the trailer in the third image. The processing unit is configured to determine at least one 3D location of the at least one feature of the trailer when the trailer was in the third orientation including utilization of the at least one image location of the at least one feature of the trailer in the third image and the at least one 3D location of the at least one feature of the trailer when the trailer was in the first orientation. The processing unit is configured to determine a rotational angle of the trailer about the tow ball for the trailer in the third orientation with respect to the first orientation including utilization of the at least one 3D location of the at least one feature of the trailer when the trailer was in the first orientation and the at least one 3D location of the at least one feature of the trailer when the trailer was in the third orientation.

In other words, a calibration is determined that enables the rotation of a trailer with respect to a vehicle to be determined, which can be used to aid reversing maneuvers for example. It is known that the trailer rotates about the tow bar, such that a radius from the tow bar to a feature on the trailer stays the same as the trailer rotates. A camera that is offset by a known amount from the tow bar obtains a zero-pose image set. Then, when the trailer has rotated a second image also has one or more features of the trailer that were in the zero-pose image set. These actual physical features of the trailer, as discussed above, are at constant radii from the tow bar for the two rotational cases, but these features have both translated and rotated with respect to the camera. This information may be used to determine a system calibration, using triangulation, where the system calibration enables one or more and even a cloud of features of the trailer in its zero-pose position to be determined in terms of their 3D coordinates. Then, when the trailer has rotated this one or more or cloud of features of the trailer rotates but each feature maintains its radius distance from the tow ball. In other words, as the trailer rotates a feature of the trailer must lie on a sphere centered at the tow bar position. Thus, the system calibration enables the actual 3D positions of a cloud of features of the trailer to be determined in the zero-pose position. A subsequent image acquired when the trailer has rotated also has the one or more or cloud of features. However, in this subsequent image it is known that the radius from the tow bar of the actual feature on the trailer has not changed. Thus knowledge of the 3D positions in the zero-pose case enables the 3D positions of the same features to be determined when the trailer has rotated from a subsequently acquired image when the trailer has rotated, from which the angle of rotation can be determined.

In this manner, a trailer pose may be estimated with respect to a vehicle using just one inexpensive sensor, a rear-view camera, and without the need to apply specific markers to the trailer.

The determined rotational angle of the trailer with respect to the vehicle relates to the full pose of the trailer in terms of the 3 degrees of freedom: roll; pitch and yaw, thus providing for a more accurate and less noisy result.

Thus, tracking for example one feature can be used to determine a change in yaw, whilst tracking more than one feature may be used to determine a change in yaw angle with a greater degree of accuracy and/or determine angular changes in other degrees of freedom.

It is to be noted that the vehicle and trailer could be an articulated vehicle, such as two parts of an articulated digger or two parts of an articulated bus, in addition to a car or lorry to which is attached a trailer.

Also, the angle of the trailer can be determined relative to the vehicle when the vehicle is moving forward and backwards, and also the vehicle is in effect pushing the trailer, which is actually what occurs when a vehicle reverses with a trailer attached.

In an example, the first orientation is a known orientation of the trailer with respect to the vehicle.

In an example, in the first orientation the trailer was aligned substantially behind the vehicle, and in the second orientation the trailer was not aligned substantially behind the vehicle, and in the third orientation the trailer was not aligned substantially behind the vehicle.

In an example, the image data of the trailer in the at least one first image includes image data of the part of the trailer at the position of the tow ball, and the image data of the trailer in the second image includes image data of the part of the trailer at the position of the tow ball.

In an example, determination of the system calibration includes utilization of the location of the camera with respect to the location of the tow ball.

In an example, determination of the system calibration includes utilization of a one point method.

In an example, determination of the system calibration includes utilization of a two-point method.

In an example, determination of the system calibration includes utilization of a three-point method.

In an example, determination of the system calibration includes utilization of the eight-point method to calculate the Essential Matrix.

Thus, for example an algorithm such as the eight-point algorithm, or three-point algorithm, two-point algorithm or one-point algorithm can be used to calculate the Essential Matrix from acquired imagery and extract the trailer rotation and translation from that, from which the 3D positions of features on the trailer in the first orientation can be determined. The, one-point, two-point and three-point algorithms are modified versions of the eight-point algorithm that exploit the trailer's constrained motion to reduce the number of feature correspondences needed to calculate the Essential Matrix In this manner, an algorithm such as the eight-point algorithm is used to calculate the positions of a number of points on the trailer in the zero-pose position, then a 3D cloud algorithm is used to determine the rotation of the trailer away from the zero-pose position on the basis of a corresponding acquired image of the trailer in its rotated position.

In an example, determination of the at least one image location of the at least one feature of the trailer in the one of the at least one first image includes analysis of this image along with a further one of the at least one first image that was acquired when the vehicle had moved forward in a substantially straight line.

In other words, the first orientation imagery can be acquired whilst the vehicle drives in a straight line. This ensures that the trailer is in a zero-pose position behind the vehicle, and facilies determination of features of the trailer with respect to the background. This is because the imagery associated with the background will change between images but that associated with the trailer will not, at least not to a great degree.

In an example, determination of the rotational angle of the trailer about the tow ball for the trailer in the third orientation includes a comparison between the determined at least one 3D location of the at least one feature of the trailer in the first orientation with the determined at least one 3D location of the at least one feature of the trailer in the third orientation.

In an example, determination of the rotational angle includes utilization of a Singular Value Decomposition.

According to a second aspect of the disclosure, a vehicle is provided that includes an apparatus according to the first aspect of the disclosure, a camera fixedly mounted to the vehicle, a tow ball fixedly mounted to the vehicle, and an output unit.

The camera is mounted to the vehicle at a location other than a location where the tow ball is mounted to the vehicle. The location of the camera is known with respect to the location of the tow ball. A trailer can rotate about the tow ball. The vehicle is configured to move the trailer in forward and backward directions when the trailer is mounted to the tow ball. The camera is configured to acquire the at least one first image, the second image and the third image. The output unit is configured to output the rotational angle of the trailer about the tow ball for the trailer in the third orientation with respect to the first orientation.

What is meant by the location of the camera being known with respect to the location of the tow ball is that in a coordinate system (such as a Cartesian coordinate system), centered for example on the tow ball, the position of the camera is known with respect to the tow ball. Thus, the x, y, and z coordinates of the camera are known with respect to the tow ball. Alternatively, a coordinate system (such as a Cartesian coordinate system) may be centered for example on the camera, and the position of the tow ball is known with respect to the camera. Thus, the x, y, and z coordinates of the tow ball are known with respect to the camera. It is clear, that such a coordinate system can be centered anywhere, and the position of the tow ball with respect to the camera may similarly be known.

According to a third aspect of the disclosure, a method for determining an angle of a trailer with respect to a vehicle is provided. The method includes a) acquiring at least one first image by a camera fixedly mounted to a vehicle at a location other than a location of a tow ball fixedly mounted to the vehicle, where the location of the camera is known with respect to the location of the tow ball, where a part of a trailer at a position of the tow ball can rotate about the tow ball, and where the at least one first image is acquired when the trailer is in a first orientation with respect to the vehicle, wherein the at least one first image includes image data of the trailer. The method also includes: b) acquiring a second image by the camera when the trailer is in a second orientation with respect to the vehicle, wherein the second image includes image data of the trailer; c) providing a processing unit with the at least one first image and the second image; and d) determining by the processing unit at least one image location of at least one feature of the trailer in one of the at least one first image. The method also includes: e) determining by the processing unit at least one image location of the at least one feature of the trailer in the second image; and f) determining by the processing unit a system calibration including utilization of triangulation with respect to the at least one image location of the at least one feature of the trailer in the one of the at least one first image and the at least one image location of the at least one feature of the trailer in the second image. The method also includes g) determining by the processing unit at least one 3D location of the at least one feature of the trailer when the trailer was in the first orientation including utilization of the at least one image location of the at least one feature of the trailer in the one of the at least one first image and the system calibration; h) acquiring by the camera a third image, where the third image is acquired when the trailer is in a third orientation with respect to the vehicle, where the third image includes image data of the trailer; i) providing the processing unit with the third image; and j) determining by the processing unit at least one image location of the at least one feature of the trailer in the third image. Additionally, the method includes k) determining by the processing unit at least one 3D location of the at least one feature of the trailer when the trailer was in the third orientation including utilization of the at least one image location of the at least one feature of the trailer in the third image and the at least one 3D location of the at least one feature of the trailer when the trailer was in the first orientation; and l) determining by the processing unit a rotational angle of the trailer about the tow ball for the trailer in the third orientation with respect to the first orientation including utilization of the at least one 3D location of the at least one feature of the trailer when the trailer was in the first orientation and the at least one 3D location of the at least one feature of the trailer when the trailer was in the third orientation.

Another aspect of the disclosure provides a computer program element controlling apparatus as previously described which, when the computer program element is executed by a processing unit, is adapted to perform the method steps as previously described.

Another aspect of the disclosure provides a computer readable medium having stored the computer element as previously described.

Advantageously, the benefits provided by any of the above aspects equally apply to all of the other aspects and vice versa.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 shows rotation of the trailer about the tow ball in the three degrees of freedom of yaw, pitch and roll;

FIG. 6 shows an image of the trailer acquired by a camera attached to the vehicle of the trailer directly behind the vehicle (zero-pose reference image) and an image acquired by the camera when the vehicle has carried out a turn (test image);

Like reference symbols in the various drawings indicate like elements.

DETAILED DESCRIPTION

Figure 1:
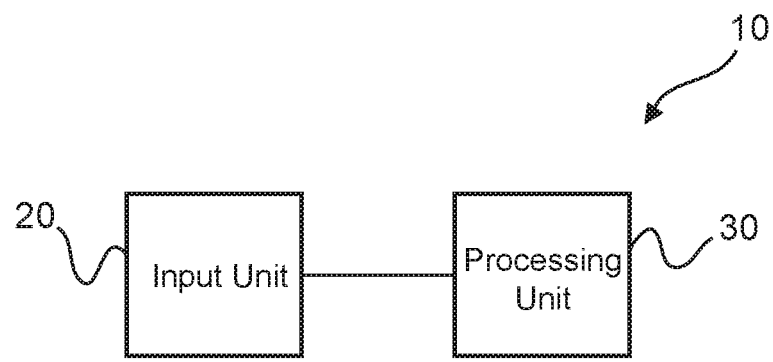
FIG. 1 shows a schematic set up of an example of an apparatus for determining an angle of a trailer attached to a vehicle.

FIG. 1 shows an example of an apparatus 10 for determining an angle of a trailer with respect to a vehicle. The apparatus 10 includes an input unit 20, and a processing unit 30. The input unit 20 is configured to provide the processing unit 30 with at least one first image and a second image. The at least one first image was acquired by a camera fixedly mounted to a vehicle at a location other than a location of a tow ball fixedly mounted to the vehicle. The location of the camera is known with respect to the location of the tow ball. A part of a trailer at a position of the tow ball can rotate about the tow ball. The at least one first image was acquired when the trailer was in a first orientation with respect to the vehicle. The at least one first image includes image data of the trailer. The second image was acquired when the trailer was in a second orientation with respect to the vehicle. The second image includes image data of the trailer. The processing unit 30 is configured to determine at least one image location of at least one feature of the trailer in one of the at least one first image. The processing unit 30 is configured also to determine at least one image location of the at least one feature of the trailer in the second image. The processing unit 30 is configured also to determine a system calibration including utilization of triangulation with respect to the at least one image location of the at least one feature of the trailer in the one of the at least one first image and the at least one image location of the at least one feature of the trailer in the second image. The processing unit is configured to determine at least one 3D location of the at least one feature of the trailer when the trailer was in the first orientation including utilization of the at least one image location of the at least one feature of the trailer in the one of the at least one first image and the system calibration. The input unit is configured to provide the processing unit with a third image. The third image was acquired when the trailer was in a third orientation with respect to the vehicle. The third image includes image data of the trailer. The processing unit 30 is configured to determine at least one image location of the at least one feature of the trailer in the third image. The processing unit 30 is configured also to determine at least one 3D location of the at least one feature of the trailer when the trailer was in the third orientation including utilization of the at least one image location of the at least one feature of the trailer in the third image and the at least one 3D location of the at least one feature of the trailer when the trailer was in the first orientation. The processing unit 30 is configured to determine a rotational angle of the trailer about the tow ball for the trailer in the third orientation with respect to the first orientation including utilization of the at least one 3D location of the at least one feature of the trailer when the trailer was in the first orientation and the at least one 3D location of the at least one feature of the trailer when the trailer was in the third orientation.

In some examples, the first orientation is a known orientation of the trailer with respect to the vehicle.

In some examples, in the first orientation the trailer was aligned substantially behind the vehicle. In the second orientation the trailer was not aligned substantially behind the vehicle. In the third orientation the trailer was not aligned substantially behind the vehicle.

In some implementations, the image data of the trailer in the at least one first image includes image data of the part of the trailer at the position of the tow ball. The image data of the trailer in the second image includes image data of the part of the trailer at the position of the tow ball.

In some examples, determination of the system calibration includes utilization of the location of the camera with respect to the location of the tow ball.

In some examples, determination of the system calibration includes utilization of a one-point method.

In some examples, determination of the system calibration includes utilization of a two-point method.

In some examples, determination of the system calibration includes utilization of a three-point method.

In some examples, determination of the system calibration includes utilization of the eight-point method.

In some examples, determination of the at least one image location of the at least one feature of the trailer in the one of the at least one first image includes analysis of this image along with a further one of the at least one first image that was acquired when the vehicle had moved forward in a substantially straight line.

In some implementations, determination of the rotational angle of the trailer about the tow ball for the trailer in the third orientation includes a comparison between the determined at least one 3D location of the at least one feature of the trailer in the first orientation with the determined at least one 3D location of the at least one feature of the trailer in the third orientation.

In some examples, determination of the rotational angle includes utilization of a Singular Value Decomposition.

Figure 2:
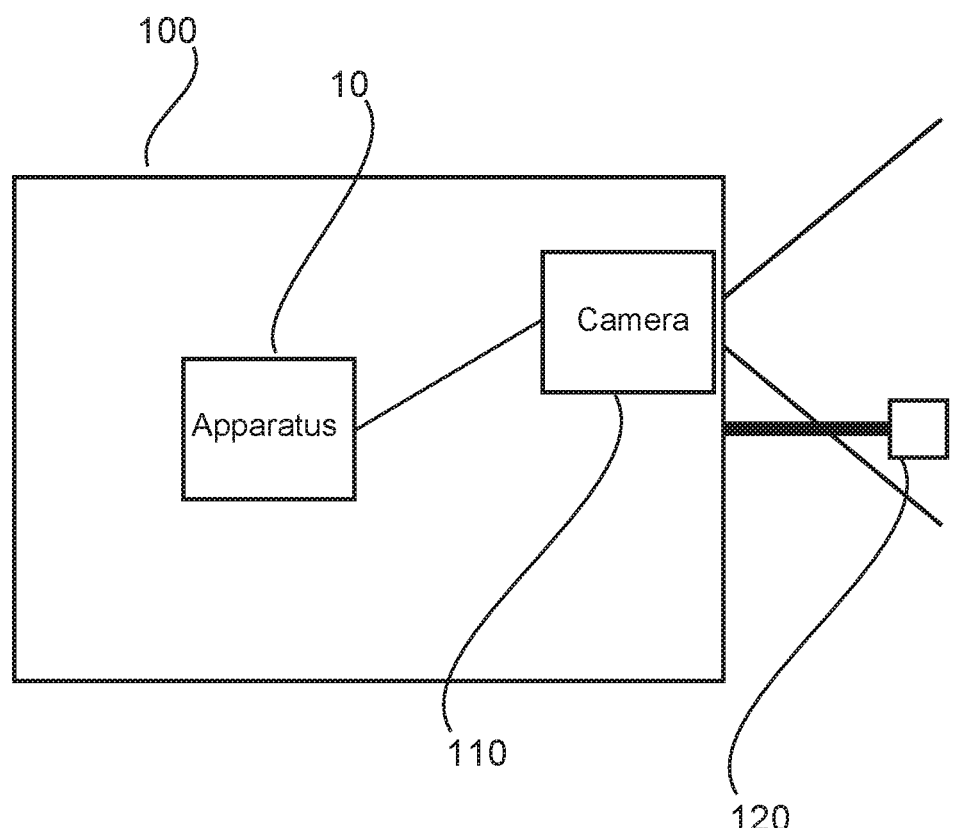
FIG. 2 shows a schematic set up of an example of a vehicle that has an apparatus for determining an angle of a trailer attached to the vehicle.

FIG. 2 shows an example of a vehicle 100. The vehicle 100 includes an apparatus 10 as described with respect to FIG. 1. The vehicle 100 also includes a camera 110 fixedly mounted to the vehicle, a tow ball 120 fixedly mounted to the vehicle, and an output unit 130. The camera 110 is mounted to the vehicle 100 at a location other than a location where the tow ball 120 is mounted to the vehicle 100. The location of the camera 110 is known with respect to the location of the tow ball 120. A trailer 400 (FIG. 4) can rotate about the tow ball 120. The vehicle 100 is configured to move the trailer 400 in forward and backward directions when the trailer 400 is mounted to the tow ball 120. The camera 110 is configured to acquire the at least one first image, the second image and the third image. The output unit 130 is configured to output the rotational angle of the trailer about the tow ball 120 for the trailer in the third orientation with respect to the first orientation.

Figure 3:
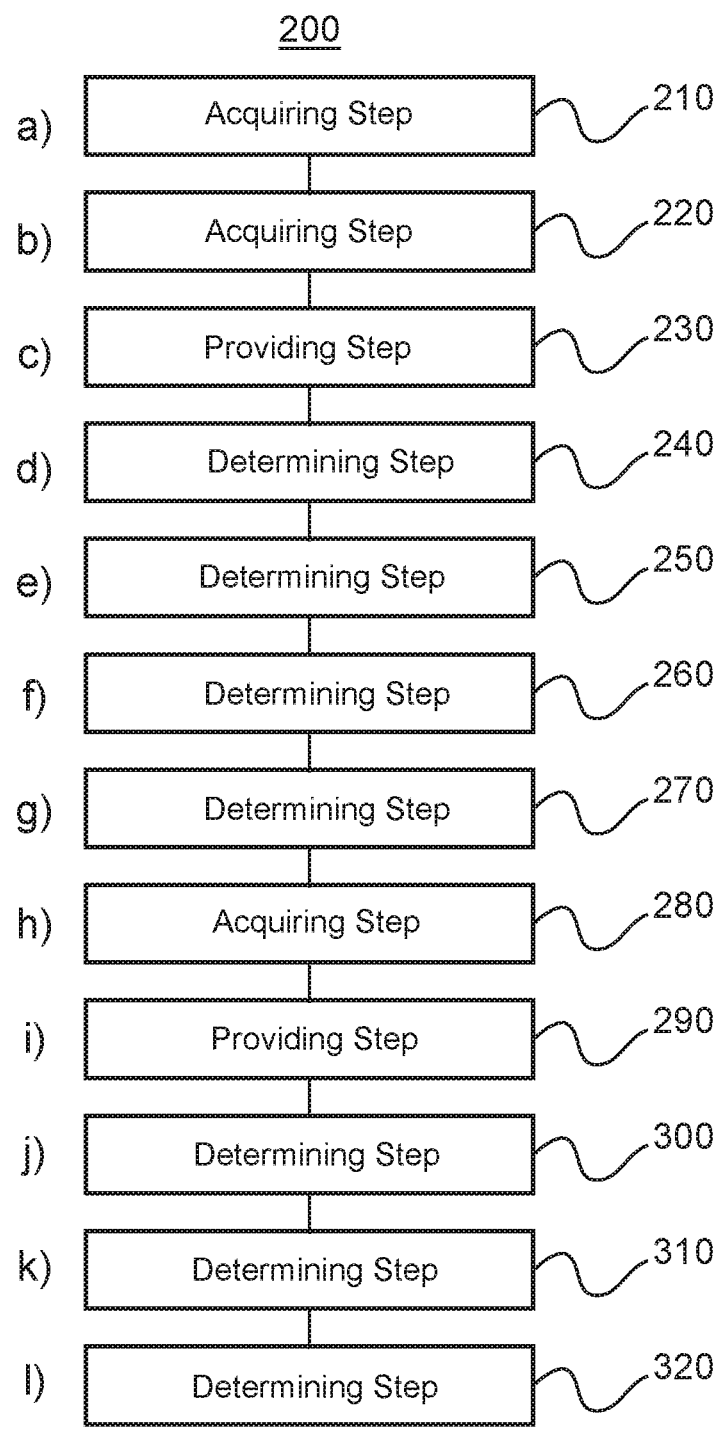
FIG. 3 shows a method for determining an angle of a trailer attached to a vehicle.

FIG. 3 shows a method 200 for determining an angle of a trailer 400 with respect to a vehicle 100 (shown in FIG. 2) in its basic steps. The method 200 includes, in an acquiring step 210, also referred to as step a), acquiring at least one first image by a camera fixedly mounted to a vehicle at a location other than a location of a tow ball fixedly mounted to the vehicle. The location of the camera is known with respect to the location of the tow ball, and a part of a trailer at a position of the tow ball can rotate about the tow ball. The at least one first image is acquired when the trailer is in a first orientation with respect to the vehicle, and the at least one first image includes image data of the trailer.

In an acquiring step 220, also referred to as step b), the method 200 includes acquiring a second image by the camera when the trailer is in a second orientation with respect to the vehicle. The second image includes image data of the trailer.

In a providing step 230, also referred to as step c), the method 200 includes providing a processing unit with the at least one first image and the second image.

In a determining step 240, also referred to as step d), the method 200 includes determining by the processing unit at least one image location of at least one feature of the trailer in one of the at least one first image.

In a determining step 250, also referred to as step e), the method 200 includes determining by the processing unit at least one image location of the at least one feature of the trailer in the second image.

In a determining step 260, also referred to as step f), the method 200 includes determining by the processing unit a system calibration including utilization of triangulation with respect to the at least one image location of the at least one feature of the trailer in the one of the at least one first image and the at least one image location of the at least one feature of the trailer in the second image.

In a determining step 270, also referred to as step g), the method 200 includes determining by the processing unit at least one 3D location of the at least one feature of the trailer when the trailer was in the first orientation including utilization of the at least one image location of the at least one feature of the trailer in the one of the at least one first image and the system calibration.

In an acquiring step 280, also referred to as step h), the method 200 includes acquiring by the camera a third image. The third image is acquired when the trailer is in a third orientation with respect to the vehicle, wherein the third image includes image data of the trailer.

In a providing step 290, also referred to as step i), the method 200 includes providing the processing unit with the third image.

In a determining step 300, also referred to as step j), the method 200 includes determining by the processing unit at least one image location of the at least one feature of the trailer in the third image.

In a determining step 310, also referred to as step k), the method 200 includes determining by the processing unit at least one 3D location of the at least one feature of the trailer when the trailer was in the third orientation including utilization of the at least one image location of the at least one feature of the trailer in the third image and the at least one 3D location of the at least one feature of the trailer when the trailer was in the first orientation.

In a determining step 320, also referred to as step l), the method 200 includes determining by the processing unit a rotational angle of the trailer about the tow ball for the trailer in the third orientation with respect to the first orientation including utilization of the at least one 3D location of the at least one feature of the trailer when the trailer was in the first orientation and the at least one 3D location of the at least one feature of the trailer when the trailer was in the third orientation.

In some examples, the first orientation is a known orientation of the trailer with respect to the vehicle.

In some examples, in the first orientation the trailer was aligned substantially behind the vehicle; and in the second orientation the trailer was not aligned substantially behind the vehicle; and in the third orientation the trailer was not aligned substantially behind the vehicle.

In some examples, the image data of the trailer in the at least one first image includes image data of the part of the trailer at the position of the tow ball; and the image data of the trailer in the second image includes image data of the part of the trailer at the position of the tow ball.

In an example, step f) includes utilizing the location of the camera with respect to the location of the tow ball.

In an example, step f) includes utilizing a one-point method.

In an example, step f) includes utilizing a two-point method.

In an example, step f) includes utilizing a three-point method.

In an example, step f) includes utilizing the eight-point method.

In an example, step d) includes analyzing the one of the at least one image along with a further one of the at least one first image that was acquired when the vehicle had moved forward in a substantially straight line.

In an example, step l) includes a comparison between the determined at least one 3D location of the at least one feature of the trailer in the first orientation with the determined at least one 3D location of the at least one feature of the trailer in the third orientation.

The apparatus, vehicle and method that are described above are now described in further detail with respect to FIGS. 4-13.

Figure 4:
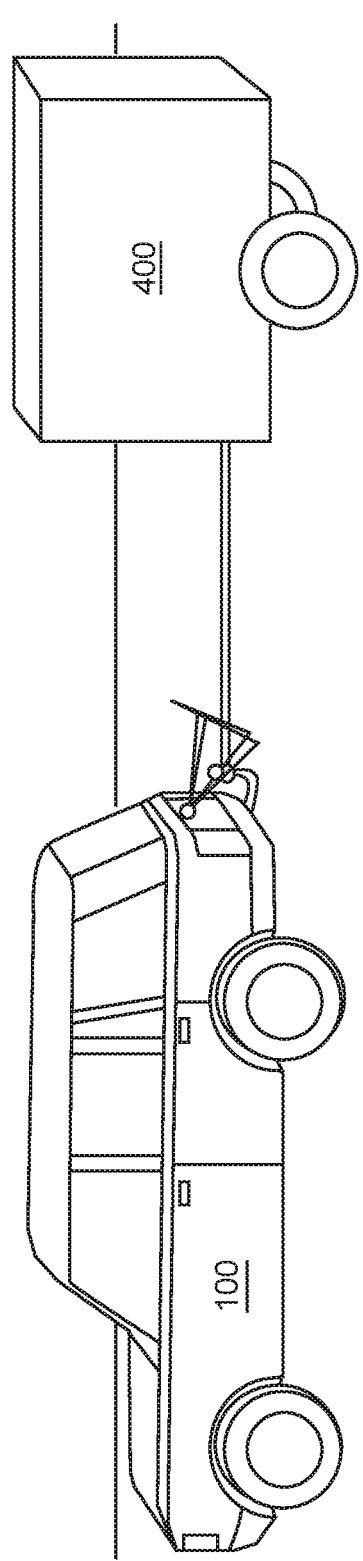
FIG. 4 shows an image of a trailer attached to a vehicle

FIG. 4 shows a trailer 400 attached to a vehicle 100. The vehicle 100 has a tow ball to which a draw bar of the trailer is attached. A rearward looking camera of the vehicle is offset from the tow ball and images the trailer and tow ball. The position of the camera is known with respect to the position of the tow ball.

FIG. 5 shows the three angular degrees of freedom of yaw, pitch and roll that can be determined by the presently described apparatus and method.

Before the angle of the trailer to the vehicle can be determined, the shape or at least the position of certain features on the trailer must be learnt during a training procedure. In a first part of the training procedure the driver drives in a straight line forward with the trailer attached. The trailer will tend towards a zero-pose position behind the vehicle with roll=pitch=yaw=0. Non static features between images acquired as the driver drives forward are determined to belong to the background, whilst static features between images are determined to belong to the trailer. A number of features of the trailer along with the tow ball can then be identified in a zero-pose image. Such an image is shown in the left hand image of FIG. 6. Then the driver executes a turn, whilst driving forward. The features identified in the zero-pose image are then matched to the same features in an image acquired during this turn. Such a second image acquired during the turn is shown in the right hand image of FIG. 6. Knowledge of the camera's position and the tow ball's position and the direction in which the camera is pointing and the image features in the zero-pose image and the same features in the image during the turn enables the 3D position of each feature being tracked on the trailer to be determined. An essential matrix algorithm (the eight-point algorithm) is used to determine this, where the 8 tracked features are shown in FIG. 6. However, one-point, two-point and three-point algorithms can be used. It is to be noted that it is not essential that the driver drives forward in order that the zero-pose image can be acquired with the trailer directly behind the vehicle, and the zero-pose image can be when the trailer is at an angle to the vehicle.

Figure 7:
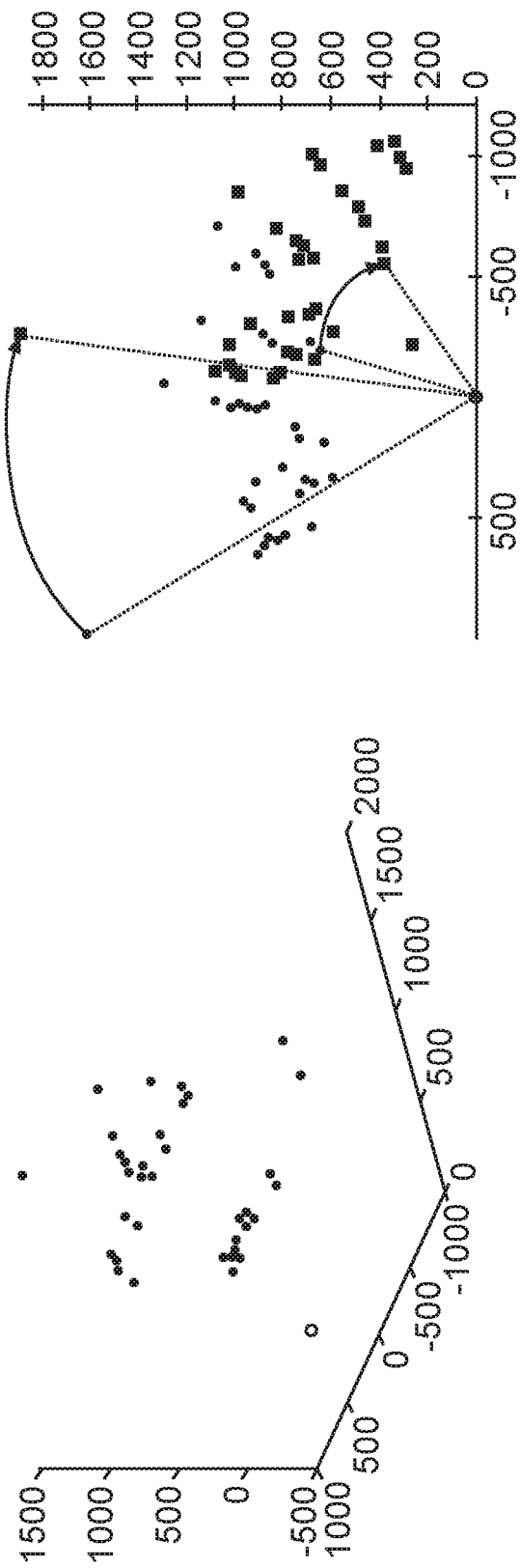
FIG. 7 shows on the left the estimated 3D locations of features on the trailer and the tow ball for the zero-pose reference image shown in FIG. 6 with respect to the position of the camera, and on the right the estimated 3D locations of the features on the trailer are again shown for the zero-pose reference image with respect to the position of the tow ball along with the 3D locations of the same features on the trailer in the test image in FIG. 6.
Figure 13:
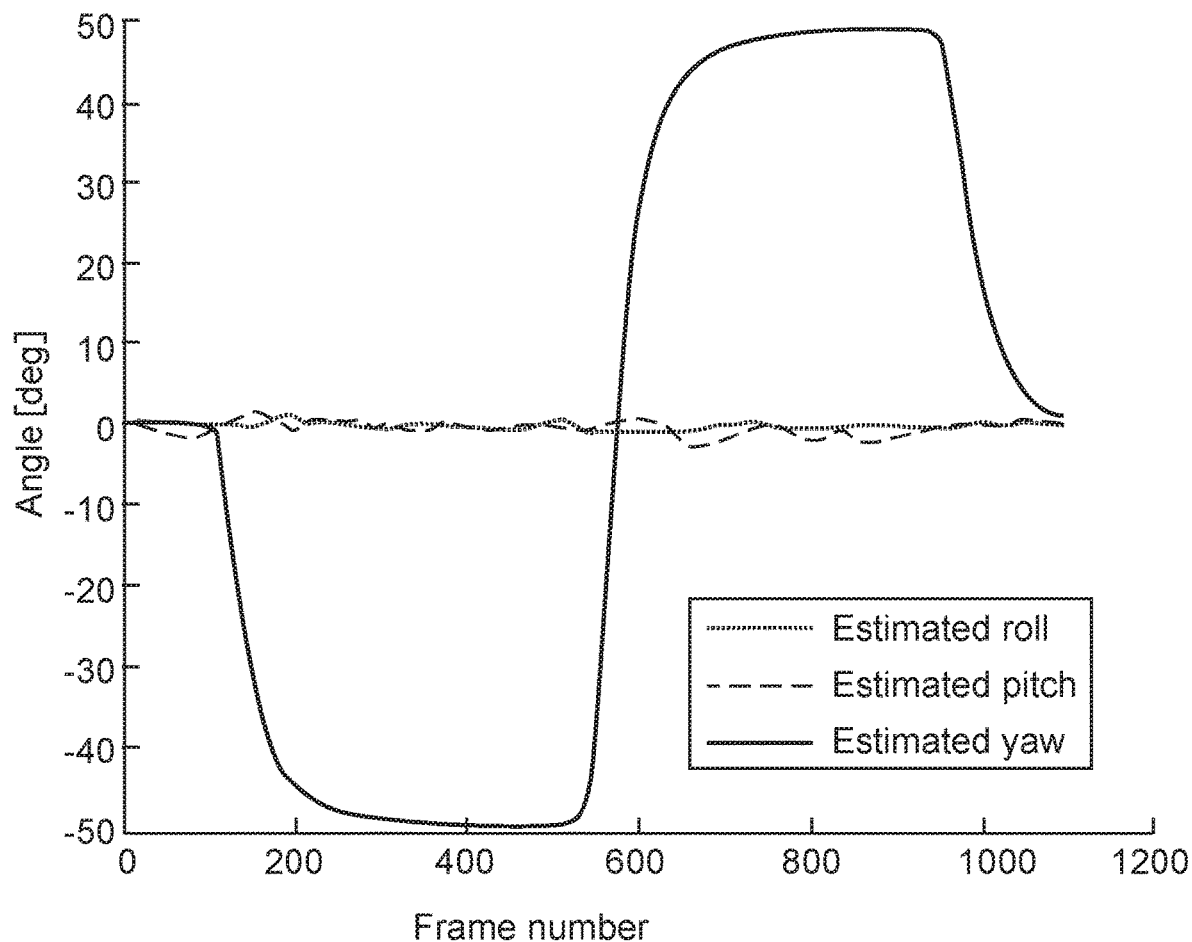
FIG. 13 shows the determined roll, pitch and yaw angles of the trailer as a function of time as the vehicle reverses with the trailer attached.

Following this training procedure, a set of image features on the trailer at zero-pose are known, along with a set of corresponding 3D features on the trailer. Since the position of the tow ball is known with respect to the position of the camera, the 3D position of each feature can be determined with respect to the tow ball. Thus a 3D point cloud of features can be determined. Then when the vehicle executes a turn, for example when reversing, a new image is acquired and the angle of the trailer determined as follows. For each 3D point, the distance 'r' of this 3D point from the tow ball is known. It is also known that when the trailer rotates about the tow ball, the new position of the 3D point must be on a sphere centered at the tow ball of radius r. The intersection of the optical ray of the corresponding image feature with the sphere around the tow ball is calculated for each of the features. This produces a new 3D point cloud of features for the trailer at an angle. The rotation between this new 3D point cloud of features, and the zero-pose 3D point cloud of features is calculated, to determine the trailer rotation. This is carried out using a Singular Value Decomposition (SVD), but can be determined in other ways. This is shown in FIG. 7, where the determined angles of yaw, roll and pitch during turning are shown in FIG. 13. In FIG. 7, in the left hand plot the hollow dot represents the location of the tow ball, and the solid round dots represent the 3D features in the zero-pose orientation. Then in the right hand plot of FIG. 7, for ease of representation the origin is now at the position of the tow ball, and the 3D features in the zero-pose orientation are again shown as solid round dots, with the same 3D features in the current pose shown as larger square dots, with angular movement between these orientations shown. Utilization of this 3D cloud of features enables, yaw, pitch and roll angles to be determined. However, as discussed below only one feature need be utilized and this enables the yaw angle to be determined in certain situations.

In FIGS. 8-12, a detailed workflow relating to the training procedure and determination of trailer angle is presented, providing a step by step visualization of implementation of the above described method.

Figure 8:
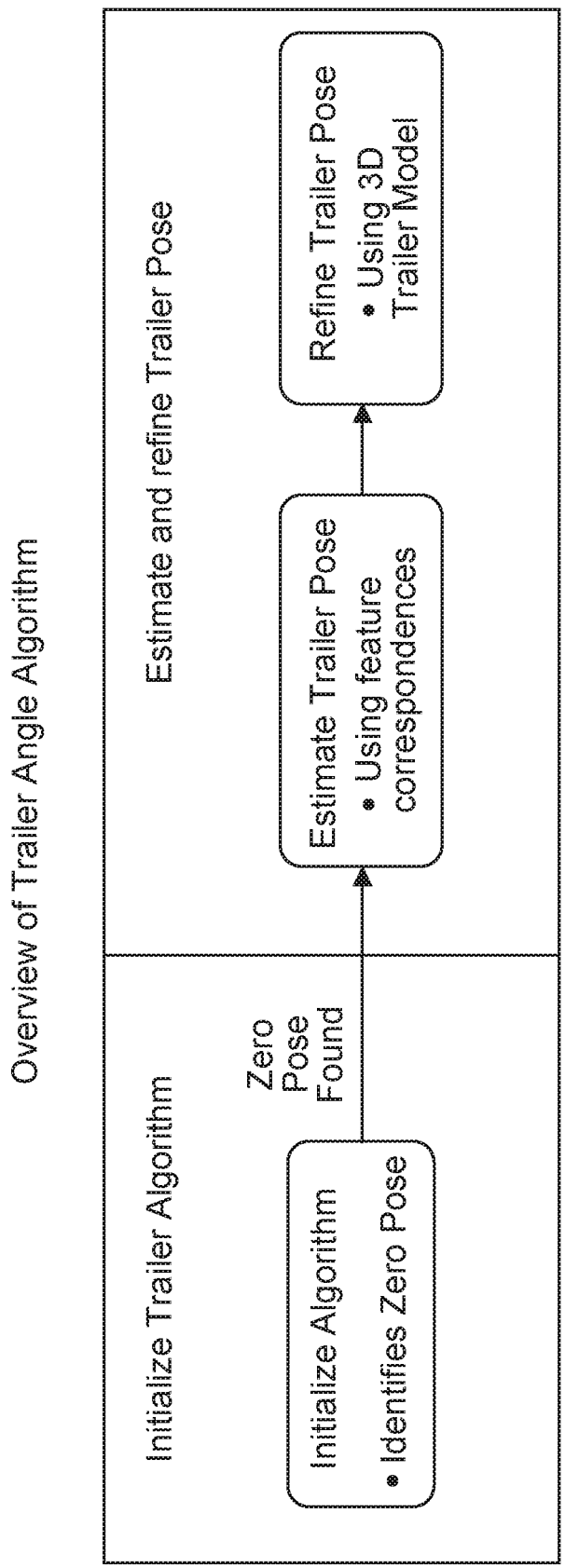
FIGS. 8-12 show a detailed workflow for the determination of the angle of the trailer.

FIG. 8 shows an overview of Trailer Angle Algorithm. In overview, the three stages of the algorithm are shown:

1. Initialization: This is necessary to identify the zero-pose of the trailer.

2. Estimate Trailer Pose: During this stage, the trailer angle is estimated using feature correspondences between the zero-pose and the current image.

3. Refine Trailer Pose: After the angle of the trailer has been estimated, the angle is refined, by iteratively building a 3d model of the trailer and re-estimating the trailer angle.

Figure 9:
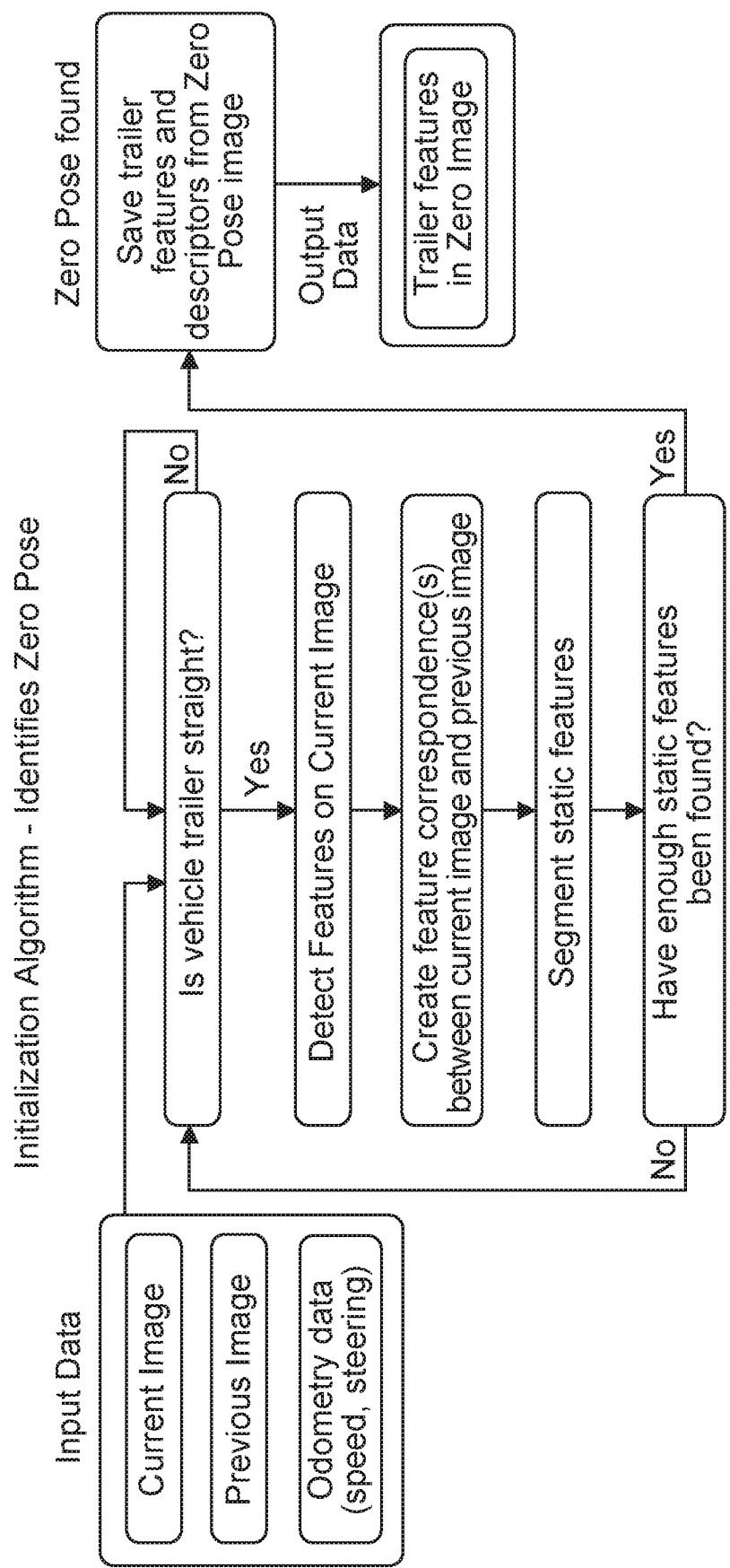
Figure 10:
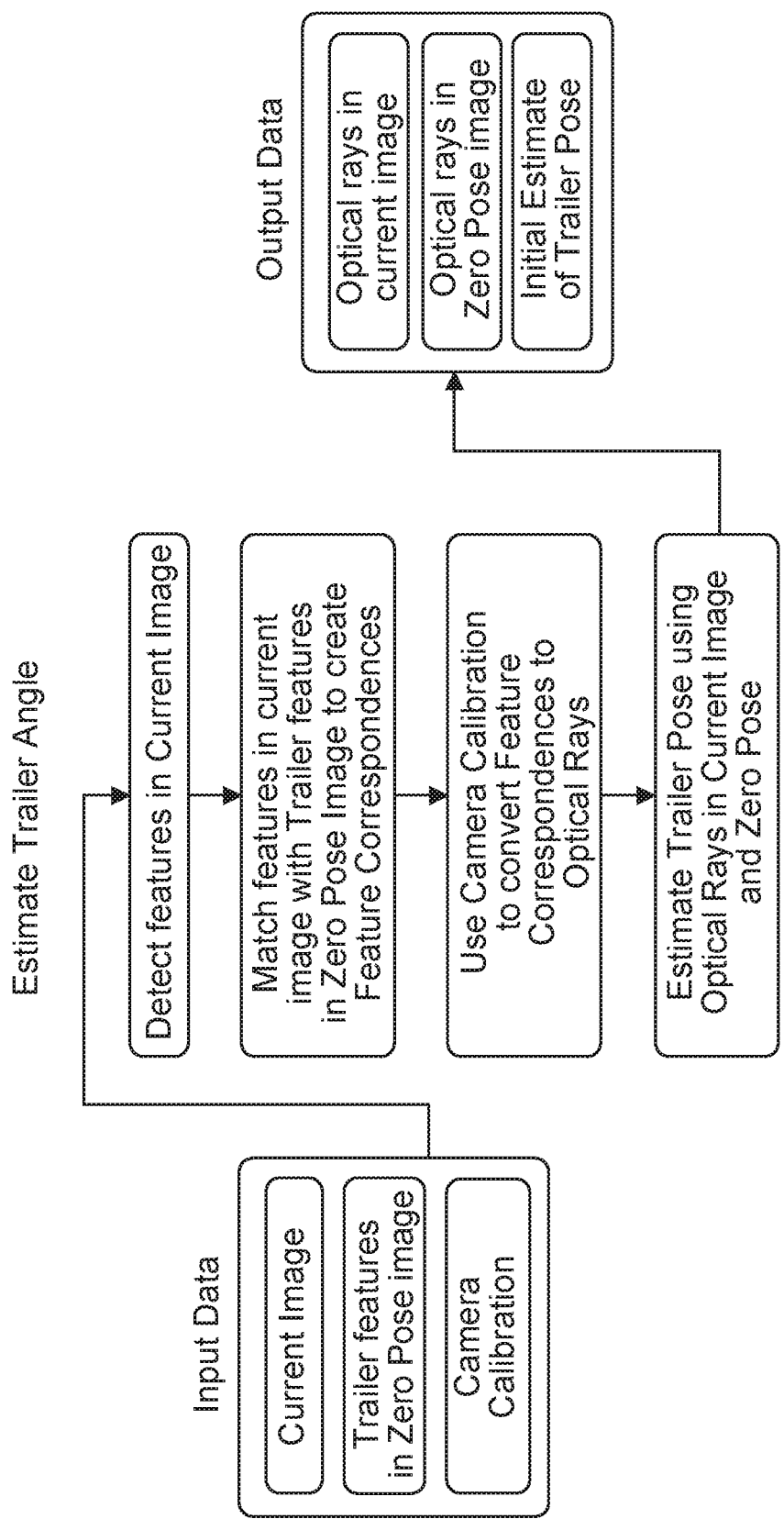

FIG. 9 shows the Initialization algorithm. During this phase, the user must drive the vehicle forwards in a straight line so that the algorithm can segment the trailer features and identify the position of those features in the image when the trailer is at the zero-pose. This allows the algorithm to deal with any shape of trailer and calculate the angle of the trailer relative to the zero-pose. The system continues in this stage until enough static features have been found, at which point, the features and their descriptors are saved to memory. In some implementations, ORB features can be used. For more details of ORB features refer to: https://en.wikipedia.org/wiki/Oriented_FAST_and_rotated_BRIEF FIG. 10 shows the estimation of the trailer angle. Once the zero-pose has been identified, the system is able to operate and calculate the trailer angle. The system estimates the angle from the current image and the list of features at the zero-pose. Features in the current image are found and matched with those at the zero-pose, creating a list of feature correspondences. These are then used, together with the camera calibration, to estimate the rotation. The camera calibration converts an image coordinate into a ray of light in 3D space. The rotation can be calculated by first calculating the Essential Matrix, for instance by using the eight-point algorithm (https://en.wikipedia.org/wiki/Eight-point_algorithm) and extracting rotation from that. However, this is can lead to noise, due to the number of degrees of freedom. Therefore, a modified essential matrix method is utilized, using knowledge that the trailer movement must be a rotation around the tow bar (ball). This simplifies the above eight-point algorithm into a one-point, two-point and three-point algorithm depending on how many angles are wished to calculate.

The essential matrix method is modified as follows. Given a point correspondence m in the reference frame with zero rotation and z in the current frame, Epipolar Constraint $$z^T E m = 0 \quad (1)$$

Where E is the Essential Matrix. This matrix encapsulates the rotation and translation of the camera between the current frame and the reference image. For rotation about a tow ball the essential matrix can be written as:

$$E = [P]_x R - R[P]_x$$

Where:
P is the 3-vector of the known tow ball position
$[P]_x$ is the skew-symmetric matrix of P
R is the 3×3 rotation matrix representing the unknown rotation (yaw, pitch and roll) of the trailer.

The unknown rotation can be parameterized as:

$$R = 2(q_c q_c^T + q_r [q_c]_x) + (2q_r^2 - 1)I$$

where
I is the identity matrix.
q is a quaternion: $q = [q_r, q_C]^T$
$q_r$ is the real part of a quaternion and,
$q_C = [q_x, q_y, y_z]^T$ is the imaginary part of a quaternion.

Now the Epipolar Constraint can be simplified to $$\bar{q}^T A \bar{q} + b^T \bar{q} = 0 \quad (1)$$

Where:

$\bar{q} = [\bar{q}_x, \bar{q}_y, \bar{q}_z]^T$ where: $\bar{q}_x = q_x/q_r, \bar{q}_y = q_y/q_r$ and $\bar{q}_z = q_z/q_r$ $A = \tilde{z} m^T - z \tilde{m}^T$ $b^T = z^T [\tilde{m}]_x - \tilde{z}^T [m]_x$ where: $\tilde{z}^T = z^T [P]_x$ and $\tilde{m} = [P]_x m$ Equation (1) can then be used to solve for the angle of the trailer. For instance, given two point correspondences in the zero-pose reference image with zero rotation and current image with unknown rotation $m_i$, $z_i$, $m_j$, $z_j$ two constraints can be obtained:

$$\begin{cases} \bar{q}^T A_i \bar{q} + b_i^T \bar{q} = 0 \\ \bar{q}^T A_j \bar{q} + b_j^T \bar{q} = 0 \end{cases}$$

There are three unknowns in above two equations, so a third constraint is needed, that there is zero roll, and this leads to the "two-point algorithm".

The number of feature correspondences required corresponds to the number of angles which need to be calculated:
one-point algorithm assumes pitch and roll are zero and estimates yaw only using one feature correspondence.
two-point algorithm assumes roll is zero and estimates pitch and yaw using two feature correspondences.
three-point algorithm estimates yaw, pitch and roll using three feature correspondences.

Now the system of three equations with three unknown variables can be efficiently solved by a variety of numerical or analytical methods.

Figure 11:
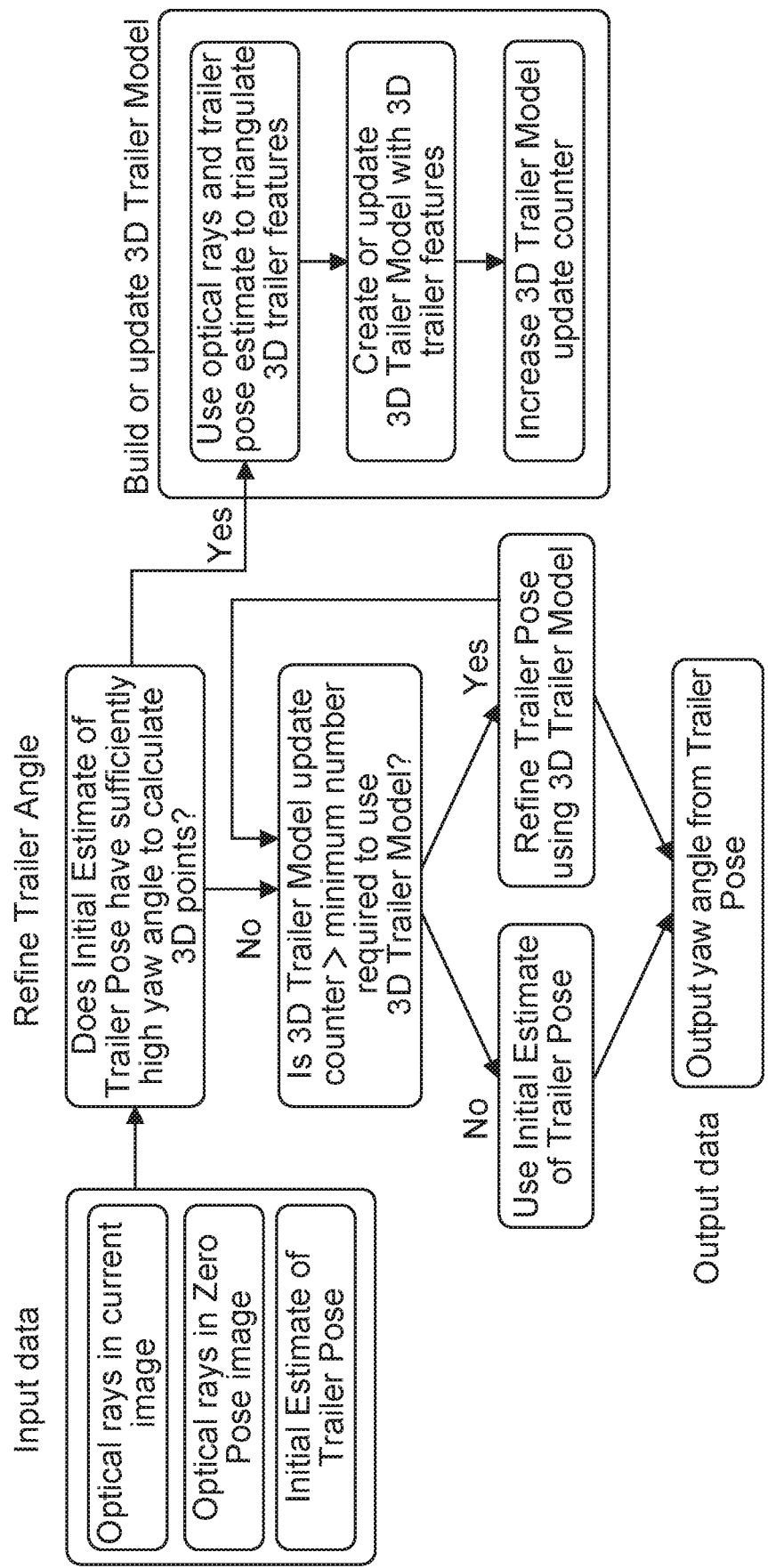

This method on its own, can lead to noisy and inconsistent angle estimates, because the feature matching, especially at large trailer angles (greater than 45 degrees), can be inaccurate. This is addressed through refining the trailer angle, as shown in FIG. 11. After the angle of the trailer has been estimated, the angle is refined, by iteratively building a 3D model of the trailer and re-estimating the trailer angle when the 3D model is detailed enough. This is inspired by the SLAM method: (https://en.wikipedia.org/wiki/Simultaneous_localization_and_mapping). However, the method has been redesigned for the constrained motion of the trailer. The refinement process produces more accurate and smoother estimates because the process of building the 3D model averages the errors in the feature correspondences over a number of frames. If the above estimate of the trailer angle is greater than a certain threshold, the 3D position of each feature associated with a feature correspondence is calculated to produce a 3d model of the trailer at the zero-pose. This is updated for each frame using a Gaussian mixture model or moving average. Once this 3D trailer model has been updated a certain number of times it is considered to be accurate enough to refine the trailer angle. This refinement is more accurate and less noisy than the previous estimate.

Figure 12:
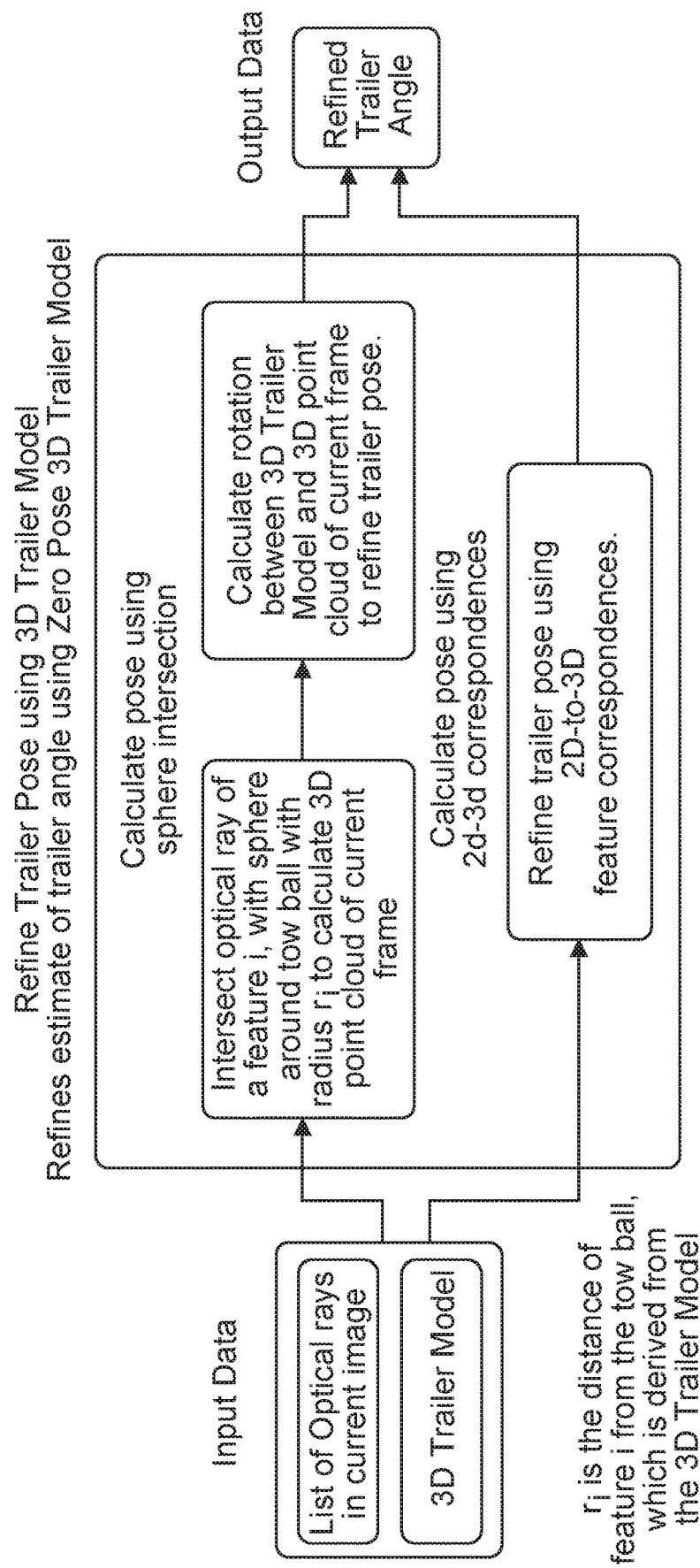

FIG. 12 relates to refining the trailer pose using the 3D trailer model. This flowchart explains in detail how the trailer angle is refined using the 3D model of trailer features. The first method intersects each 3D ray of an image feature with a sphere around the tow ball for that 3d feature. The radius of the sphere is the distance of the 3D feature from the tow ball (since features on the trailer must rotate around the tow ball as if on a sphere). This computes the rotated 3D point cloud representing the trailer at the current pose. A Singular Value Decomposition algorithm can then be used to calculate the rotation of this point cloud vs the 3D trailer model (which shows the trailer at the zero-pose). Alternatively a Perspective-n-point algorithm could be used (https://en.wikipedia.org/wiki/Perspective-n-Point). This calculates the camera's position given a set of 2D-3D correspondences. In this case, the 2D correspondences would be the image features in the current frame, and the 3D correspondences would be the 3d trailer model. To further refine the above, the perspective n point algorithm can be modified to consider the constraint that the cameras "movement" must be constrained on a sphere around the tow bar, with the radius being equal to the distance from the camera to the tow bar.

It is to be noted, as discussed briefly above, that the system can operate when only one feature, as now discussed in more detail:

The system can also operate with only one feature. This is possible because the trailer must move on the ground plane, which is predominantly flat. Therefore its position relative to the car (vehicle) can be approximated by yaw angle only, with roll and pitch assumed to be zero.

There is some loss of accuracy with this approach however, especially if the ground is not smooth and flat. This is somewhat offset by the reduced number of calculations needed, which will result in a lower latency and faster update frequency.

In the case of one feature, some of the processes can apply:
Initialization
The initialization procedure is mostly similar; however, the system can finish the initialization procedure when only 1 good quality feature has been obtained, at which point, the system will store this feature and its descriptor.

Although only one feature is required, a greater number of features identified at the zero-pose stage will increase the chances these same features can be identified in future images. This is because over time, lighting and weather changes may alter the appearance of the trailer, which in turn alters the descriptor of a feature. This reduces the chance any individual feature may be found in the current image. Many feature descriptors are designed to cope with these changes to some extent, however.

Estimate Trailer Angle

With one feature only, trailer angle estimation can be carried out with a modified two/three-point method with a zero roll and zero pitch assumption. The zero roll and zero pitch assumption means that now only one-point is required to estimate the trailer yaw angle.

Alternatively, it is possible to formulate an analytical solution, for instance, by projected the 3D camera rays, camera, and tow bar position onto the ground plane, and considering the problem in 2D only.

Refine Trailer Angle

Once the yaw angle has been determined, the 3D location of the feature can be calculated using the 3D camera rays. The system can then proceed as before to refine the estimate of the trailer angle using the 3D location of the tracked feature.

In some implementations, a computer program or computer program element is provided that configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

According to a further example of the present disclosure, a computer readable medium, such as a CD-ROM, is presented where the computer readable medium has a computer program element stored on it which computer program element is described by the preceding section.

It has to be noted that implementations and examples of the disclosure are described with reference to different subject matters. In particular, some implementations and examples are described with reference to method type claims whereas other implementations and examples are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and foregoing description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "including" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

A number of implementations have been described. Nevertheless, it will be understood that various modifications may be made without departing from the spirit and scope of the disclosure. Accordingly, other implementations are within the scope of the following claims.

What is claimed is:

1. An apparatus for determining an angle of a trailer with respect to a vehicle, the apparatus comprising:
   an input unit; and
   a processing unit;
   wherein, the input unit is configured to provide the processing unit with at least one first image and a second image,
   wherein the at least one first image was acquired by a camera fixedly mounted to the vehicle at a location other than a location of a tow ball fixedly mounted to the vehicle, and wherein the location of the camera is known with respect to the location of the tow ball;
   wherein a part of the trailer at a position of the tow ball can rotate about the tow ball;
   wherein the at least one first image was acquired when the trailer was in a first orientation with respect to the vehicle, wherein the at least one first image comprises image data of the trailer;
   wherein the second image was acquired when the trailer was in a second orientation with respect to the vehicle, and wherein the second image comprises image data of the trailer;
   wherein, the processing unit is configured to determine at least one image location of at least one feature of the trailer in one of the at least one first image, and determine at least one image location of the at least one feature of the trailer in the second image;
   wherein the processing unit is configured to determine a system calibration comprising utilization of triangulation with respect to the at least one image location of the at least one feature of the trailer in the one of the at least one first image and the at least one image location of the at least one feature of the trailer in the second image;
   wherein the processing unit is configured to determine at least one 3D location of the at least one feature of the trailer when the trailer was in the first orientation comprising utilization of the at least one image location of the at least one feature of the trailer in the one of the at least one first image and the system calibration;
   wherein, the input unit is configured to provide the processing unit with a third image, wherein the third image was acquired when the trailer was in a third orientation with respect to the vehicle, wherein the third image comprises image data of the trailer;
   wherein, the processing unit is configured to determine at least one image location of the at least one feature of the trailer in the third image;

wherein the processing unit is configured to determine at least one 3D location of the at least one feature of the trailer when the trailer was in the third orientation comprising utilization of the at least one image location of the at least one feature of the trailer in the third image and the at least one 3D location of the at least one feature of the trailer when the trailer was in the first orientation; and wherein, the processing unit is configured to determine a rotational angle of the trailer about the tow ball for the trailer in the third orientation with respect to the first orientation comprising utilization of the at least one 3D location of the at least one feature of the trailer when the trailer was in the first orientation and the at least one 3D location of the at least one feature of the trailer when the trailer was in the third orientation.

2. The apparatus according to claim 1, wherein the first orientation is a known orientation of the trailer with respect to the vehicle.

3. The apparatus according to claim 1, wherein in the first orientation the trailer was aligned substantially behind the vehicle; and wherein in the second orientation the trailer was not aligned substantially behind the vehicle; and wherein in the third orientation the trailer was not aligned substantially behind the vehicle.

4. The apparatus according to claim 1, wherein the image data of the trailer in the at least one first image comprises image data of the part of the trailer at the position of the tow ball; and wherein the image data of the trailer in the second image comprises image data of the part of the trailer at the position of the tow ball.

5. The apparatus according to claim 1, wherein determination of the system calibration comprises utilization of the location of the camera with respect to the location of the tow ball.

6. The apparatus according to claim 1, wherein determination of the system calibration comprises utilization of a one-point method.

7. The apparatus according to claim 1, wherein determination of the system calibration comprises utilization of a two-point method or a three-point method.

8. The apparatus according to claim 1, wherein determination of the system calibration comprises utilization of an eight-point method for calculating an essential matrix.

9. The apparatus according to claim 1, wherein determination of the at least one image location of the at least one feature of the trailer in the one of the at least one first image comprises analysis of this image along with a further one of the at least one first image that was acquired when the vehicle had moved forward in a substantially straight line.

10. The apparatus according to claim 1, wherein determination of the rotational angle of the trailer about the tow ball for the trailer in the third orientation comprises a comparison between the determined at least one 3D location of the at least one feature of the trailer in the first orientation with the determined at least one 3D location of the at least one feature of the trailer in the third orientation.

11. A vehicle, comprising:
an apparatus according to claim 1;
a camera fixedly mounted to the vehicle;
a tow ball fixedly mounted to the vehicle; and
an output unit;
wherein the camera is mounted to the vehicle at a location other than a location where the tow ball is mounted to the vehicle, and wherein the location of the camera is known with respect to the location of the tow ball;

wherein, a trailer can rotate about the tow ball and wherein the vehicle is configured to move the trailer in forward and backward directions when the trailer is mounted to the tow ball;

wherein, the camera is configured to acquire the at least one first image, the second image and the third image; and wherein the output unit is configured to output the rotational angle of the trailer about the tow ball for the trailer in the third orientation with respect to the first orientation.

12. A method for determining an angle of a trailer with respect to a vehicle, the method comprising:

acquiring at least one first image by a camera fixedly mounted to the vehicle at a location other than a location of a tow ball fixedly mounted to the vehicle, wherein the location of the camera is known with respect to the location of the tow ball, wherein a part oft trailer at a position of the tow ball can rotate about the tow ball, and wherein the at least one first image is acquired when the trailer is in a first orientation with respect to the vehicle, wherein the at least one first image comprises image data of the trailer;

acquiring a second image by the camera when the trailer is in a second orientation with respect to the vehicle, wherein the second image comprises image data of the trailer;

providing a processing unit with the at least one first image and the second image;

determining by the processing unit at least one image location of at least one feature of the trailer in one of the at least one first image;

determining by the processing unit at least one image location of the at least one feature of the trailer in the second image;

determining by the processing unit a system calibration comprising utilization of triangulation with respect to the at least one image location of the at least one feature of the trailer in the one of the at least one first image and the at least one image location of the at least one feature of the trailer in the second image;

determining by the processing unit at least one 3D location of the at least one feature of the trailer when the trailer was in the first orientation comprising utilization of the at least one image location of the at least one feature of the trailer in the one of the at least one first image and the system calibration;

acquiring by the camera a third image, wherein the third image is acquired when the trailer is in a third orientation with respect to the vehicle, wherein the third image comprises image data of the trailer;

providing the processing unit with the third image;

determining by the processing unit at least one image location of the at least one feature of the trailer in the third image;

determining by the processing unit at least one 3D location of the at least one feature of the trailer when the trailer was in the third orientation comprising utilization of the at least one image location of the at least one feature of the trailer in the third image and the at least one 3D location of the at least one feature of the trailer when the trailer was in the first orientation; and determining by the processing unit a rotational angle of the trailer about the tow ball for the trailer in the third orientation with respect to the first orientation comprising utilization of the at least one 3D location of the at least one feature of the trailer when the trailer was in the first orientation and the at least one 3D location of the at least one feature of the trailer when the trailer was in the third orientation.

13. The method according to claim 12, wherein the first orientation is a known orientation of the trailer with respect to the vehicle.

14. The method according to claim 12, wherein in the first orientation the trailer was aligned substantially behind the vehicle; and wherein in the second orientation the trailer was not aligned substantially behind the vehicle; and wherein in the third orientation the trailer was not aligned substantially behind the vehicle.

15. The method according to claim 12, wherein the image data of the trailer in the at least one first image comprises image data of the part of the trailer at the position of the tow ball; and wherein the image data of the trailer in the second image comprises image data of the part of the trailer at the position of the tow ball.

16. The method according to claim 12, wherein determination of the system calibration comprises utilization of the location of the camera with respect to the location of the tow ball.

17. The method according to claim 12, wherein determination of the system calibration comprises utilization of a one-point method.

18. The method according to claim 12, wherein determination of the system calibration comprises utilization of a two-point method or a three-point method.

19. The method according to claim 12, wherein determination of the system calibration comprises utilization of an eight-point method for calculating an essential matrix.

20. The method according to claim 12, wherein determination of the at least one image location of the at least one feature of the trailer in the one of the at least one first image comprises analysis of this image along with a further one of the at least one first image that was acquired when the vehicle had moved forward in a substantially straight line.

* * * * *